United States Patent [19]

Kim

[11] Patent Number: 5,110,858

[45] Date of Patent: * May 5, 1992

[54] TETRAFLUOROETHYLENE POLYMER COMPOSITIONS CONTAINING PARTICULATE CARBON

[75] Inventor: Young H. Kim, Wilmington, Del.

[73] Assignee: E. I. Du Pont de Nemours and Company, Wilmington, Del.

[*] Notice: The portion of the term of this patent subsequent to Jan. 14, 2009 has been disclaimed.

[21] Appl. No.: 500,048

[22] Filed: Mar. 23, 1990

[51] Int. Cl.$^5$ .............................................. C08L 67/04
[52] U.S. Cl. ................................... 524/496; 524/502; 524/546; 525/186; 525/190
[58] Field of Search ............... 525/186, 140; 524/502, 524/546, 496

[56]  References Cited

U.S. PATENT DOCUMENTS

| | | |
|---|---|---|
| 2,685,707 | 8/1954 | Liewellyn . |
| 2,961,712 | 1/1960 | Davis ................................ 524/546 |
| 2,985,918 | 5/1961 | Moore . |
| 3,054,761 | 9/1962 | Moore . |
| 3,407,249 | 10/1968 | Landi . |
| 3,592,877 | 7/1971 | Mullins ............................. 525/186 |
| 3,679,614 | 7/1972 | Shah . |
| 3,992,350 | 11/1976 | Bensa ................................ 524/546 |
| 4,370,436 | 1/1983 | Nakamura ........................... 524/546 |

FOREIGN PATENT DOCUMENTS

| | | |
|---|---|---|
| 49-11912 | 2/1974 | Japan . |
| 49-039642 | 4/1974 | Japan . |
| 58-25368 | 2/1983 | Japan . |
| 1390100 | 4/1975 | United Kingdom . |

OTHER PUBLICATIONS

J. F. Lontz et al., Ind. Eng. Chem., vol. 44, pp. 1805-1810.

*Primary Examiner*—Patricia Short

[57] ABSTRACT

A composition comprising tetrafluoroethylene polymers, selected poly(2,2-dialkylpropiolactones) and particulate carbon, especially conductive carbon. It is useful as a molding compound for making parts, especially for electrical uses.

30 Claims, No Drawings

TETRAFLUOROETHYLENE POLYMER COMPOSITIONS CONTAINING PARTICULATE CARBON

FIELD OF INVENTION

A mixture of tetrafluoroethylene polymers, polymers of selected poly(2,2-dialkylpropiolactones) and particulate carbon is disclosed. Such mixtures are useful to improve processing of tetrafluoroethylene polymers, and readily undergo pyrolysis to give tetrafluoroethylene polymer parts with improved physical properties.

BACKGROUND OF THE INVENTION

Fabrication of polytetrafluoroethylene (PTFE) and some copolymers of tetrafluoroethylene, including those containing particulate carbon, is often difficult, due to the fact that even above their melting points they flow little if at all. Thus typical plastics melt processing techniques are often useless with such polymers. Previous attempts have been made by others to make these polymers more processible, in order to make usable parts. It is well known in the art to use particulate carbon to improve the physical properties of polymers and polymer parts, and to impart electrical conductivity to such polymers and parts.

Thus U.S. Pat. No.2,685,707 and J. F. Lontz, et. al., Ind. Eng. Chem., vol. 44. pp. 1805–1810 report that many low molecular weight organic compounds such as hydrocarbon and esters can be used as "lubricants" to aid in the forming of parts from particulate PTFE. The lubricants are removed typically by volatilization and/or sintering, and a solid part is produced by sintering the remaining PTFE.

U.S. Pat. Nos. 3,407,249 and 3,679,614 report that porous PTFE parts are produced by mixing particulate PTFE with poly(methyl methacrylate) (PMMA) and other compounds. The PMMA and other compounds can be removed by use of solvents for the PMMA such as acetone.

U.S. Pat. Nos. 2,985,918 and 3,054,761 describe a process for making and using a composition comprising PTFE and PMMA. This mixture may be sintered to volatilize and decompose the PMMA, and to sinter the PTFE, so that a porous PTFE article is produced.

British Patent 1,390,100 describes a mixture of a polyolefin such as polyethylene, PTFE and for example carbon black or bronze powder. The polyolefin is believed to act as a processing aid.

Japanese Patent Application 49/039642 discloses PTFE containing powdered graphite Japanese Patent Application 49/11912 discloses a dispersion in water of a mixture of PTFE and conductive carbon, which can be used to make a conductive coating.

Japanese Patent Application 58/25368 describes a paste containing, among other items, PTFE aqueous dispersion and an electrically conductive powder such as graphite or carbon black. This too can be used to make electrically conductive coatings.

Among the desired properties a material should impart to PTFE in order to help form PTFE parts containing particulate carbon, are, easy mixing of the components, good green strength of the mixture so parts of the mixture will not deform readily, especially under sintering conditions, and clean sintering of the processing aid (lubricant) so that the remaining PTFE part is free of impurities (e.g., ash and char) and has a minimum amount of porosity. It is the object of this invention to provide such a composition and a process for making and using it. None of the above references teaches the use of poly(2,2-dialkylpropiolactones) as lubricants or processing aids for PTFE.

SUMMARY OF THE INVENTION

A mixture containing tetrafluoroethylene polymer (TFEP), selected poly(2,2-dialkylpropiolactones) (PDAP) and particulate carbon (PC) is provided. This mixture is useful for producing moldings and extrusions of TFEP which have improved physical properties and may be electrically conducting. After a molding or extrusion part is formed, the PDAP may be removed from the part by pyrolysis; the PDAP is readily and cleanly pyrolyzed from the TFE containing polymer PC mixture.

DETAILS OF THE INVENTION

This invention provides a composition comprising about 5% to about 50% by weight of a first polymer consisting essentially of repeat units of the formula —(—CH$_2$—CR$^1$R$^2$—C(O)O—)—, about 95% to about 50% by weight of a tetrafluoroethylene polymer, and about 1% to about 233% by weight of said tetrafluoroethylene polymer of particulate carbon, wherein R$^1$ and R$^2$ are independently chosen alkyl groups, and provided that the total number of carbon atoms in R$^1$ and R$^2$ is about 20 or less.

By the term "tetrafluoroethylene polymer" (herein TFEP) is herein meant a polymer of tetrafluoroethylene in which up to about 20 mole percent of the tetrafluoroethylene monomer may be substituted by other fluorinated monomers. Suitable fluorinated monomers include, but are not limited to, hexafluoropropylene, perfluoro(methyl vinyl ether), vinylidene fluoride and chlorotrifluoroethylene.

Polymers of the formula —(—CH$_2$—CR$^1$R$^2$—C(O)O—)— (herein PDAP) are preferably prepared by anionic polymerization (using tetraalkylammonium carboxylates as initiators) of 2,2-dialkylsubstituted-beta-propiolactones as disclosed in W. H. Sharkey in Ring Opening Polymerization, J. E. McGrath Ed., ACS Symposium Series 286, American Chemical Society, Washington, D.C., p. 373 and references cited therein. The monomeric beta-propiolactones are prepared by procedures described by D. B. Johns, et. al., in Ring-Opening Polymerization, Vol. 1, K. J. Ivin and T. Saegusa, Eds., Elsevier Applied Science Publishers, New York, N.Y. 1984, Chap. 7. In addition to the polymerization of 2,2-dialkylsubstituted-beta-propiolactones, the polymers of this invention can also be produced by the polymerization of the cyclic carbonate of 2,2-dialkyl-substituted-3-hydroxypropionic acid, or of the free hydroxy acid itself. They are often referred to as poly(2,2-dialkylpropiolactones). In preferred PDAPs, R$^1$ and R$^2$ contain about 10 carbon atoms or less. In an especially preferred PDAP R$^1$ is methyl and R$^2$ is n-propyl. It is also preferred if the PDAP has a melting point below about 200° C. The degree of polymerization of the PDAP should not be too high or too low. The degree of polymerization should be at least about 70 to provide sufficient green strength to the blend. Although no upper limit is known for the PDAP degree of polymerization, very high degrees of polymerization (>10,000) will unnecessarily increase the viscosity of the (melted)

blends. A preferred degree of polymerization range for the PDAP is about 100 to about 5,000.

In preferred blends the PDAP is about 10% to about 30% by weight and the TFEP is about 90% to about 70% by weight. In especially preferred blends the PDAP is about 15% by weight to about 25% by weight and the TFEP is about 85% to about 75% by weight.

By the term "particulate carbon" (PC) is meant herein the types of carbon, usually in the form of small particles or fibers, that are typically used as fillers and/or reinforcing agents for polymers. Such materials include, but are not limited to, carbon black, acetylene black, powdered graphite and carbon fibers. An especially preferred form of particulate carbon is one that is "conductive carbon". By the term "conductive carbon" herein is meant small particles of carbon that are electrically conducting. Such materials include, but are not limited to, selected carbon blacks, powdered graphite and carbon fibers (CF). Carbon fibers are the preferred form of particulate carbon. Especially preferred are carbon fibers, or fragments thereof, described in claim 1 of U.S. Pat. No. 4,861,653 as follows:

"1. A bat of randomly disposed carbon fibers, said fibers predominantly having in cross-section a width of less than about 12 micrometers and a fracture surface exhibiting a lamellar microstructure composed of lamellae arranged in an isoclinic relationship and disposed in a direction generally parallel to an axis of the fiber cross-section, the lamellae extending to the periphery of the fiber cross-sections."

These and other especially preferred carbon fibers have a lamellar microstructure and a distribution of diameters from about 1 micrometer to more than 10 micrometers, with a number average diameter of about 8 micrometers, and are electrically conducting. These fibers are heat treated in an inert atmosphere to above 1600° C., more preferably 2400° C. It is preferred if the amount of PC present is about 5% to about 100% by weight of the TFEP, most preferably about 10% to about 67% by weight of the TFEP present. The calculation of the amount of PC in the mixture is based on the amount of TFEP in the mixture. For example, 233% PC in the mixture means that there is 2.33 times the amount of PC than TFEP, and 1% PC means there is 0.01 times the amount of PC in the mixture as TFEP.

These mixtures are useful as molding resins which have high green strength and (for those that contain conductive carbon) are electrically conductive. The electrical conductivity makes these compositions especially useful in electrical applications, such as for shielding electric and magnetic fields, and for parts where conductivity is an advantage, as to form an electrical ground. It is well known in the art that many TFEPs (including their PC containing compositions) are difficult to process, exhibiting very high melting points, and even above their melting points, have very poor flow characteristics. These mixtures allow the processing of TFEPs into useful objects by methods such as extrusion and injection molding (infra). In addition, if desired, the PDAP in the mixture is easily and cleanly pyrolyzed from the mixture to give objects (infra) containing TFEP as the sole polymer. The mixtures may be made by the processes described below.

Up to 20% by weight (of the TFEP and PC combined) of other materials commonly present in polymers may also be present, such as fillers, pigments and antioxidants, as long as the above proporions of TFEP, PDAP and PC are maintained.

The mixture can be made by mixing about, 5% to about 50% by weight of a poly(2,2-dialkylpropiolactone) consisting essentially of repeat units of the formula —(—CH$_2$—CR$^1$R$^2$—C(O)O—)—, with about 95% to about 50% by weight of a TFEP, and about 1% to about 70% by weight of the TFEP of particulate carbon, wherein R$^1$ and R$^2$ are independently chosen alkyl groups, and provided that the total number of carbon atoms in R$^1$ and R$^2$ is about 20 or less, to form a mixture.

If desired, the mixture may then be melt blended at a temperature above the glass transition temperature and melting point of the PDAP but below about 270° C. Included within this invention are the TFEP/PDAP/PC mixtures before and after melt blending, and in the form of parts.

Mixing of the polymers and PC may be accomplished in several ways. For example, dry powder blending may be used, although care should be exercised to obtain a uniform blend. A preferred mixing method is to dissolve the PDAP in a solvent such as methylene chloride, and adding this solution to an agitated slurry of the TFEP. The liquid used to make the slurry of TFEP should be miscible with the solvent for the PDAP, but Should be a nonsolvent for the PDAP. While the resulting slurry is agitated, the solvents are evaporated to give a blend of the polymers. The PC is then dry powder blended with the powdered polymer blend (the polymer blend may have to be ground first—infra).

It has been found that some types of TFEP "powders" give blends that are agglomerated at this point. They may be rendered into a more useful form (powders) by grinding, as with a mortar and pestle, a ball mill or a hammer mill (certain types of PC, such as carbon fibers, may be degraded by grinding—they may best be added by dry powder blending after the grinding operation).

It has been found that so-called "granular TFEPs" give blends that are powders (or granular) at this point without the need for grinding. Such granular TFEPs are preferred and may be made by the process described in: U.S. Pat. No. 2,936,301; or U.S. Pat. No. 3,766,133 followed by deagglomeration in a mechanical mill. Such granular polymers are described by American Society for Testing Materials Specification D-4894-89, Type 3 Grade 1, and Type 2.

The melt blending of the mixture may be accomplished by a variety of methods known to those skilled in the art of polymer processing. For example, compression molding, that is applying pressure and heat in a hydraulic press may be used. A preferred method is a screw melter, such as in a screw extruder. This provides good mixing to provide a uniform mixture. The melt blending should be carried out at a temperature high enough to melt the PDAP, above its melting point, or if the polymer is not crystalline, above its glass transition temperature. The temperature should be kept below about 270° C. to avoid decomposition of the PDAP and/or gross separation of the PDAP and the TFEP. After the mixture is melt blended the product may be pelletized in conventional ways for further processing into a shaped part, or may be formed directly from the melted state into a shaped part as by compression molding, extrusion through a die and injection molding. Further processing into a shaped part at a later time could also be by these methods, although melting of the PDAP may not be necessary to form a shaped part. For example, moderate heat and high pressure may cause the blend to flow by plastic deformation into a shaped part. However a melt process is preferred to form the shaped part.

After the shaped part is formed, it may be used as is, having the "composite" properties of the mixture constituents. However, in order to improve certain properties such as solvent, chemical and high temperature resistance, it may be desirable to remove the PDAP so that essentially pure TFEP plus PC (plus any other nonvolatile ingredients such as filler and pigments) remains. This can be accomplished by the optional additional step of pyrolysis of a shaped part of the mixture. This comprises the additional step of pyrolyzing the shaped part from 275° C. to about 400° C., preferably about 300° C. to about 350° C. until the PDAP is converted to volatile products.

The pyrolysis may be carried out in air, or an inert atmosphere such as nitrogen. Air is preferred. As is known to those skilled in the art, pyrolyses such as these may cause porosity in the resulting TFEP part. This porosity may be minimized by raising the temperature of the shaped part slowly as the decomposition point of the PDAP (>275° C.) is approached and passed. Porosity that is formed may be reduced by densifying the pyrolyzed part. Densifying the part may be done by heating the part at about 350° C. to about 400° C. for an additional period after pyrolysis is completed. Such procedures are known in the art. It is also known in the art that the properties of the resulting pyrolyzed part may be affected by the manner in which the part is cooled after the pyrolysis or densification.

The following Example illustrates the invention. In this Example, Teflon 7A Fluorocarbon Resin (Trademark of and available from E. I. du Pont de Nemours & Co., Inc., Wilmington, Del.) is used. This grade is a homopolymer of tetrafluoroethylene, and is a so-called granular material. The PDAP used in this Example is poly(2-methyl-2-n-propylpropiolactone). Ratios of components of the mixtures are parts by weight. Tensile strength (TS), tensile modulus (TM) and percent tensile elongation to break (EB) were measured on an Instron tester at a crosshead speed of 2.54 cm/min at about 25° C., except where otherwise noted. By green strength is meant the properties of the unpyrolyzed mixture.

EXAMPLE 1

To 270 g of Teflon 7A suspended in 500 ml of methanol was added a solution of 91.3 g of PDAP (inherent viscosity 0.32 in methylene chloride. The Teflon slurry was stirred vigorously as the PDAP solution was added over about 10 min. The slurry was agitated while the solvent was evaporated with a stream of nitrogen. A white powdery material weighing 357.7 g was obtained.

The polymer blend was passed through an 80 mesh sieve, and then 15 g of the sieved powder was mixed with 10 g of chopped carbon fiber (as described in U.S. Pat. No. 4,861,653, claim 1), and mixed on a roller mixer for 24 hr. This gives a mixture with 83% (of the amount of Teflon present) carbon fiber. Another mixture containing 31% (of the amount of Teflon present) carbon fiber, and 20 weight percent of PDAP (based on the total of the PDAP and Teflon present) was similarly produced.

The mixtures were extruded from a capillary rheometer at temperatures between 120° C. and 180° C. to form rods. The viscosity dropped as the temperature increased. The flow characteristics at 150° C. are given in Table 1. The physical properties of the extrudates, measured at 25° C., are given in Table 2.

TABLE 1

| Shear Rate (sec$^{-1}$) | Shear Stress (psi) | | |
|---|---|---|---|
| | 0% CF | 31% CF | 83% CF |
| 22.8 | 34 | 36 | 99 |
| 26.1 | 50.4 | 49.3 | 114 |
| 228.3 | 85.5 | 68.0 | 141.5 |
| 260.9 | 116.3 | 114.1 | 179.8 |

TABLE 2

| | % Carbon Fiber | |
|---|---|---|
| | 31 | 83 |
| TS (psi) | 2220 ± 60 | 2400 ± 90 |
| TM (Kpsi) | 54 ± 12 | 46 ± 15 |
| EB (%) | 10 ± 1 | 8 ± 2 |

The rods were heated at 325° C. for 24 to 60 hr in air in order to pyrolyze the PDAP. The weight and dimensional changes, and physical properties are summarized in Table 3.

TABLE 3

| | % Carbon Fiber | |
|---|---|---|
| | 31 | 83 |
| Weight before pyrolyzing | 1.1383 g | 0.6428 g |
| Weight after pyrolyzing | 0.9234 g | 0.5468 g |
| Length before pyrolyzing | 152.5 cm | 82.5 cm |
| Length after pyrolyzing | 132.5 cm | 67.3 cm |
| TS (psi) | 2600 ± 90 | 1700 ± 120 |
| TM (Kpsi) | 57 ± 12 | 27 ± 4 |
| EB (%) | 30 ± 5 | 24 ± 6 |

The conductivities were measured by the four point measurement method using 1 to 30 microampere current. They are:

| As extruded: | |
|---|---|
| 31% carbon fiber | nonconducting |
| 83% carbon fiber | 2.76 × 10$^{-3}$ ohm$^{-1}$cm$^{-1}$ |
| After heating (pyrolyzing): | |
| 31% carbon fiber | 1.94 × 10$^{-2}$ ohm$^{-1}$cm$^{-1}$ |
| 83% carbon fiber | 1.17 × 10$^{-2}$ ohm$^{-1}$cm$^{-1}$ |

Although preferred embodiments of the invention have been described hereinabove, it is to be understood that there is no intention to limit the invention to the precise constructions herein disclosed, and it is to be further understood that the right is reserved to all changes coming within the scope of the invention as defined by the appended claims.

I claim:

1. A composition comprising about 5% to about 50% by weight of a first polymer consisting essentially of repeat units of the formula —($-CH_2-CR^1R^2-C(O)O-$)—, about 95% to about 50% by weight of a tetrafluoroethylene polymer, and about 1% to about 233% by weight of said tetrafluoroethylene polymer of particulate carbon, wherein $R^1$ and $R^2$ are independently chosen alkyl groups, and provided that the total number of carbon atoms in $R^1$ and $R^2$ is about 20 or less.

2. A composition as recited in claim 1 wherein said particulate carbon is a conductive carbon.

3. A composition as recited in claim 2 wherein said first polymer is present from about 10% to about 30% by weight, and said tetrafluoroethylene polymer is present from about 90% to about 70% by weight.

4. A composition as recited in claim 3 wherein said first polymer is present from about 15% to about 25% by weight, and said tetrafluoroethylene polymer is present from about 85% to about 75% by weight.

5. A composition as recited in claim 2 wherein said total number of carbon atoms in said $R^1$ and $R^2$ is 10 or less.

6. The composition as recited in claim 5 wherein said $R^1$ is methyl and said $R^2$ is n-propyl.

7. The composition as recited in claim 3 wherein said $R^1$ is methyl and said $R^2$ is n-propyl.

8. The composition as recited in claim 4 wherein said $R^1$ is methyl and said $R^2$ is n-propyl.

9. The composition as recited in claim 2 wherein said first polymer has a melting point of about 200° C. or less.

10. The composition as recited in claim 4 wherein said first polymer has a melting point of about 200° C. or less.

11. The composition as recited in claim 2 wherein said first polymer has a degree of polymerization of about 70 to about 10,000.

12. The composition as recited in claim 11 wherein said first polymer has a degree of polymerization of about 100 to about 5,000.

13. The composition as recited in claim 2 wherein said conductive carbon is present from about 5% to about 100% by weight of said polytetrafluoroethylene polymer.

14. The composition as recited in claim 13 wherein said conductive carbon is present from about 10% to about 67% by weight of said polytetrafluoroethylene polymer.

15. The composition as recited in claim 14 wherein said conductive carbon is present from about 5% to about 100% by weight of said polytetrafluoroethylene polymer.

16. The composition as recited in claim 15 wherein said conductive carbon is present from about 10% to about 67% by weight of said polytetrafluoroethylene polymer.

17. The composition as recited in claim 7 wherein said conductive carbon is present from about 5% to about 100% by weight of said polytetrafluoroethylene polymer.

18. The composition as recited in claim 17 wherein said conductive carbon is present from about 10% to about 67% by weight of said polytetrafluoroethylene polymer.

19. The composition as recited in claim 2 wherein said conductive carbon is carbon fiber.

20. The composition as recited in claim 19 wherein said carbon fiber is carbon fiber, or fragments thereof, comprising a bat of randomly disposed carbon fibers, said fibers predominantly having in cross-section a width of less than about 12 micrometers and a fracture surface exhibiting a lamellar microstructure composed of lamellae arranged in an isoclinic relationship and disposed in a direction generally parallel to an axis of the fiber cross-section, the lamellae extending to the periphery of the fiber cross-sections.

21. The composition as recited in claim 4 wherein said conductive carbon is carbon fiber.

22. The composition as recited in claim 21 wherein said carbon fiber is carbon fiber, or fragments thereof, comprising a bat of randomly disposed carbon fibers, said fibers predominantly having in cross-section a width of less than about 12 micrometers and a fracture surface exhibiting a lamellar microstructure composed of lamellae arranged in an isoclinic relationship disposed in a direction generally parallel to an axis of the fiber cross-section, the lamellae extending to the periphery of the fiber cross-sections.

23. The composition as recited in claim 6 wherein said conductive carbon is carbon fiber.

24. The composition as recited in claim 23 wherein sad carbon fiber is carbon fiber, or fragments thereof, comprising a bat of randomly disposed carbon fibers, said fibers predominantly having in cross-section a width of less than about 12 micrometers and a fracture surface exhibiting a lamellar microstructure composed of lamellae arranged in an isoclinic relationship and disposed in a direction generally parallel to an axis of the fiber cross-section, the lamellae extending to the periphery of the fiber cross-sections.

25. The composition as recited in claim 14 wherein said conductive carbon is carbon fiber.

26. The composition as recited in claim 25 wherein said carbon fiber is carbon fiber, or fragments thereof, comprising a bat of randomly disposed carbon fibers, said fibers predominantly having in cross-section a width of less than about 12 micrometers and a fracture surface exhibiting a lamellar microstructure composed of lamellae arranged in an isoclinic relationship and disposed in a direction generally parallel to an axis of the fiber cross-section, the lamellae extending to the periphery of the fiber cross-sections.

27. The composition as recited in claim 16 wherein said conductive carbon is carbon fiber.

28. The composition as recited in claim 25 wherein said carbon fiber is carbon fiber, or fragments thereof, comprising a bat of randomly disposed carbon fibers, said fibers predominantly having in cross-section a width of less than about 12 micrometers and a fracture surface exhibiting a lamellar microstructure composed of lamellae arranged in an isoclinic relationship and disposed in a direction generally parallel to an axis of the fiber cross-section, the lamellae extending to the periphery of the fiber cross-sections.

29. The composition as recited in claim 18 wherein said conductive carbon is carbon fiber.

30. The composition as recited in claim 29 wherein said carbon fiber is carbon fiber, or fragments thereof, comprising a bat of randomly disposed carbon fibers, said fibers predominantly having in cross-section a width of less than about 12 micrometers and a fracture surface exhibiting a lamellar microstructure composed of lamellae arranged in an isoclinic relationship and disposed in a direction generally parallel to an axis of the fiber cross-section, the lamellae extending to the periphery of the fiber cross-sections.

* * * * *